(12) United States Patent
Nagata et al.

(10) Patent No.: US 9,994,124 B2
(45) Date of Patent: Jun. 12, 2018

(54) VEHICLE SEAT

(71) Applicant: TOYOTA BOSHOKU KABUSHIKI KAISHA, Aichi-ken (JP)

(72) Inventors: Hiroki Nagata, Kasugai (JP); Tetsuya Tanaka, Kariya (JP); Shogo Ishii, Kariya (JP); Kazuhisa Isshiki, Kariya (JP); Yuichi Okazaki, Kariya (JP); Keiichi Saito, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 13 days.

(21) Appl. No.: 14/940,465

(22) Filed: Nov. 13, 2015

(65) Prior Publication Data
US 2016/0137109 A1 May 19, 2016

(30) Foreign Application Priority Data

Nov. 14, 2014 (JP) .................................. 2014-231530

(51) Int. Cl.
*B60N 2/42* (2006.01)
*B60N 2/015* (2006.01)
(Continued)

(52) U.S. Cl.
CPC ........... *B60N 2/015* (2013.01); *B60N 2/0705* (2013.01); *B60N 2/4228* (2013.01);
(Continued)

(58) Field of Classification Search
CPC ...... B60N 2/509; B60N 2/015; B60N 2/0705; B60N 2/073; B60N 2/4228; B60N 2/4235; B60N 2/42709; B60N 2/502
(Continued)

(56) References Cited

U.S. PATENT DOCUMENTS 5,110,177 A * 5/1992 Akio ...................... B62D 21/11
280/784
5,626,395 A * 5/1997 Aufrere .................. B60N 2/682
297/344.15
(Continued)

FOREIGN PATENT DOCUMENTS

JP 3-53384 5/1991
JP 8-228878 9/1996
(Continued)

OTHER PUBLICATIONS

German Official Action with English translation for DE 10 2015 222 375.2, dated Jan. 27, 2017.
(Continued)

*Primary Examiner* — Syed A Islam
(74) *Attorney, Agent, or Firm* — Greenblum & Bernstein, P.L.C.

(57) ABSTRACT

A vehicle seat includes a pair of left and right slide rails each having a lower rail extending in a front and rear direction of a vehicle and an upper rail slidably mounted to the lower rail. The lower rail is fixed to a floor F via brackets and so as to be spaced apart from the floor F. A reinforcing member extending in a left and right direction is disposed so as to span between rear end portions of the lower rails, and the reinforcing member is formed such that a bending strength about an axis in an up and down direction of a seat main body is lower than a bending strength about an axis in a front and rear direction of the seat main body.

7 Claims, 8 Drawing Sheets

(51) Int. Cl.
 *B60N 2/07* (2006.01)
 *B60N 2/427* (2006.01)
 *B60N 2/50* (2006.01)

(52) U.S. Cl.
 CPC ....... *B60N 2/4235* (2013.01); *B60N 2/42709* (2013.01); *B60N 2/509* (2013.01)

(58) Field of Classification Search
 USPC ... 297/216.18, 452.2, 216.1, 216.15, 216.16, 297/452.18
 See application file for complete search history.

(56) References Cited

U.S. PATENT DOCUMENTS

| | | | |
|---|---|---|---|
| 5,988,756 A * | 11/1999 | Aufrere | B60N 2/68 297/391 |
| 6,105,920 A | 8/2000 | Gauger | |
| 6,559,392 B1 * | 5/2003 | Haynes | G01G 19/4142 177/144 |
| 6,773,069 B1 * | 8/2004 | Kaneko | B60N 2/1615 297/344.15 |
| 2004/0094683 A1 | 5/2004 | Garrido et al. | |
| 2007/0057527 A1 * | 3/2007 | Endo | B60N 2/002 296/65.13 |

FOREIGN PATENT DOCUMENTS

| | | |
|---|---|---|
| JP | 2530413 | 3/1997 |
| JP | 10-192080 | 7/1998 |
| JP | 2000-177443 | 6/2000 |
| JP | 2009-154690 | 7/2009 |
| JP | 2012-66800 | 4/2012 |
| JP | 2013-35524 | 2/2013 |
| WO | 02/17753 | 3/2002 |

OTHER PUBLICATIONS

Japanese Office Action for JP App. No. 2014-231530 dated Oct. 31, 2017, along with English-language translation thereof.
"Collection of Formulae Cross-Sectional Performance"http://www.geocities.jp/iamvocu/Technology/kousiki/kousikidanmen.htm.

* cited by examiner

VEHICLE SEAT

INCORPORATION BY REFERENCE

The disclosure of Japanese Patent Application No. 2014-231530 filed on Nov. 14, 2014 including the specification, drawings and abstract is incorporated herein by reference in its entirety.

BACKGROUND OF THE INVENTION

1. Field of the Invention

The invention relates to a vehicle seat.

2. Description of Related Art

When a rear-end collision occurs in a state in which a vehicle seat is mounted to a vehicle floor in an orientation that causes a seated passenger to face the front of a vehicle, a force that tilts a seat back rearward is applied to the vehicle seat. The force is transmitted to a seat cushion via a recliner, and is further transmitted from the seat cushion to a pair of slide rails as a force that pushes down rear portions of the slide rails. Herein, when a bracket that supports the pair of the slide rails to a floor falls in a left and right direction due to the action of a component force of the above pushing-down force in the left and right direction, an angle of the rearward tilt of the seat back is increased, a difference in relative movement distance between the body and the head of the passenger is increased, and whiplash tends to occur. To cope with this, in the vehicle seat described in Japanese Patent Application Publication No. 2009-154690 (JP 2009-154690 A), in order to prevent the pair of slide rails from moving downward greatly by the force that pushes down the rear portions of the slide rails, a low bracket that is less likely to fall in the left and right direction is provided on an extension of the slide rail in a front and rear direction and the slide rail is mounted to the floor.

SUMMARY OF THE INVENTION

In mounting of the vehicle seat to the vehicle floor, in the case where any accessory is disposed on or below the floor, there are cases where the bracket that mounts the slide rail to the floor needs to be offset in the left and right direction of the slide rail and mounted or the height of the bracket needs to be increased. In such cases, when the rear-end collision occurs in the vehicle, there has been a possibility that the force that pushes down the rear portion of the slide rail is applied from the vehicle seat, the bracket falls in the left and right direction, the rear portion of the slide rail moves downward greatly, and the rearward tilt angle of the vehicle seat is increased. At this point, in order to prevent the bracket from falling in the left and right direction and prevent the rear portion of the slide rail from moving downward greatly, it is effective to dispose a reinforcing member between the slide rails and couple the slide rails to each other. However, in the case where the slide rails are coupled to each other using the reinforcing member, when a side collision occurs in the vehicle, a compression load that is larger than that at the time of the rear-end collision is applied to the reinforcing member. At this point, when the reinforcing member bends and deforms in an up and down direction, there has been a possibility that a part of the reinforcing member interferes with and damages a lower portion of the seat cushion and the floor.

The invention provides the vehicle seat that couples the slide rails to each other using a coupling member to prevent the rear portions of the slide rails from easily moving downward at the time of the rear-end collision, and is configured such that the coupling member does not bend and deform in the up and down direction but bends and deforms in the front and rear direction when an excessive compression load is applied to the coupling member.

An aspect of the invention is a vehicle seat including a seat main body, and a pair of left and right slide rails each having a lower rail extending in a front and rear direction of a vehicle and an upper rail slidably mounted to the lower rail. The lower rail is fixed to a vehicle floor via a bracket so as to be spaced apart from the vehicle floor, the seat main body is mounted to the upper rail, a reinforcing member extending in a left and right direction is disposed between the pair of left and right lower rails or the pair of left and right upper rails, and the reinforcing member is formed such that a bending strength about an axis in an up and down direction of the seat main body is lower than a bending strength about an axis in a front and rear direction of the seat main body.

According to the above aspect, when a rear-end collision occurs in the vehicle and a force that pushes down the slide rails acts on rear portions of the pair of the left and right slide rails via the seat main body, since the reinforcing member is disposed between the lower rails or between the upper rails, it is possible to prevent the bracket from falling in the left and right direction. With this, when the rear-end collision occurs in the vehicle, it is possible to prevent the seat main body from being tilted rearward greatly. In addition, since the reinforcing member is formed such that the bending strength about the axis in the up and down direction of the seat main body is lower than the bending strength about the axis in the front and rear direction of the seat main body, even when an excessive compression load is applied to the reinforcing member due to a side collision of the vehicle or the like, the reinforcing member does not bend and deform in the up and down direction but bends and deforms in the front and rear direction. With this, it is possible to suppress a possibility that a part of the reinforcing member interferes with and damages the lower portion of the seat main body and the vehicle floor.

In the above aspect, the reinforcing member may be disposed between portions at the rear of central portions of the pair of the left and right lower rails or the pair of the left and right upper rails in the front and rear direction.

According to the above configuration, the force that pushes down the pair of the left and right slide rails generated by the rear-end collision of the vehicle is applied to the rear portions of the slide rails, and hence, by disposing the reinforcing member between the portions at the rear of the central portions of the lower rails or the upper rails in the front and rear direction, it is possible to efficiently prevent the bracket from falling in the left and right direction.

In the above aspect, a section modulus of the reinforcing member about the axis in the front and rear direction of the seat main body may change in a left and right direction of the seat main body, and the section modulus may be minimized at a central portion in the left and right direction of the seat main body, and may be gradually increased with approach to both end portions.

According to the above configuration, the bending strength about the axis in the up and down direction of the seat main body is minimized at the central portion of the reinforcing member in the left and right direction of the seat main body, and hence the reinforcing member is likely to bend and deform in the front and rear direction of the seat main body at the portion. With this, when the excessive compression load is applied to the reinforcing member, it is possible to efficiently cause the reinforcing member to bend and deform in the front and rear direction of the seat main body.

In the above aspect, the reinforcing member may be a columnar member having a substantially U-shaped cross section, may be disposed so as to span between the lower rails or the upper rails in a state in which an opening of the U-shape is directed to the front or the rear of the seat main body, and may be configured such that a length of at least one of an upper surface portion and a lower surface portion of the reinforcing member in the front and rear direction is minimized at the central portion in the left and right direction of the seat main body, and is gradually increased with approach to the both end portions.

According to the above configuration, by using the reinforcing member having a simple structure, it is possible to efficiently cause the reinforcing member to bend and deform in the front and rear direction of the seat main body when the excessive compression load is applied to the reinforcing member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

FIGS. 1 to 10 show an embodiment of the invention. The embodiment shows an example in which the invention is applied to a vehicle seat. In each of the drawings, individual directions of a vehicle when the vehicle seat is mounted to the vehicle are indicated by arrows. In the following description, the description related to directions is assumed to be made based on the directions.

Figure 1:
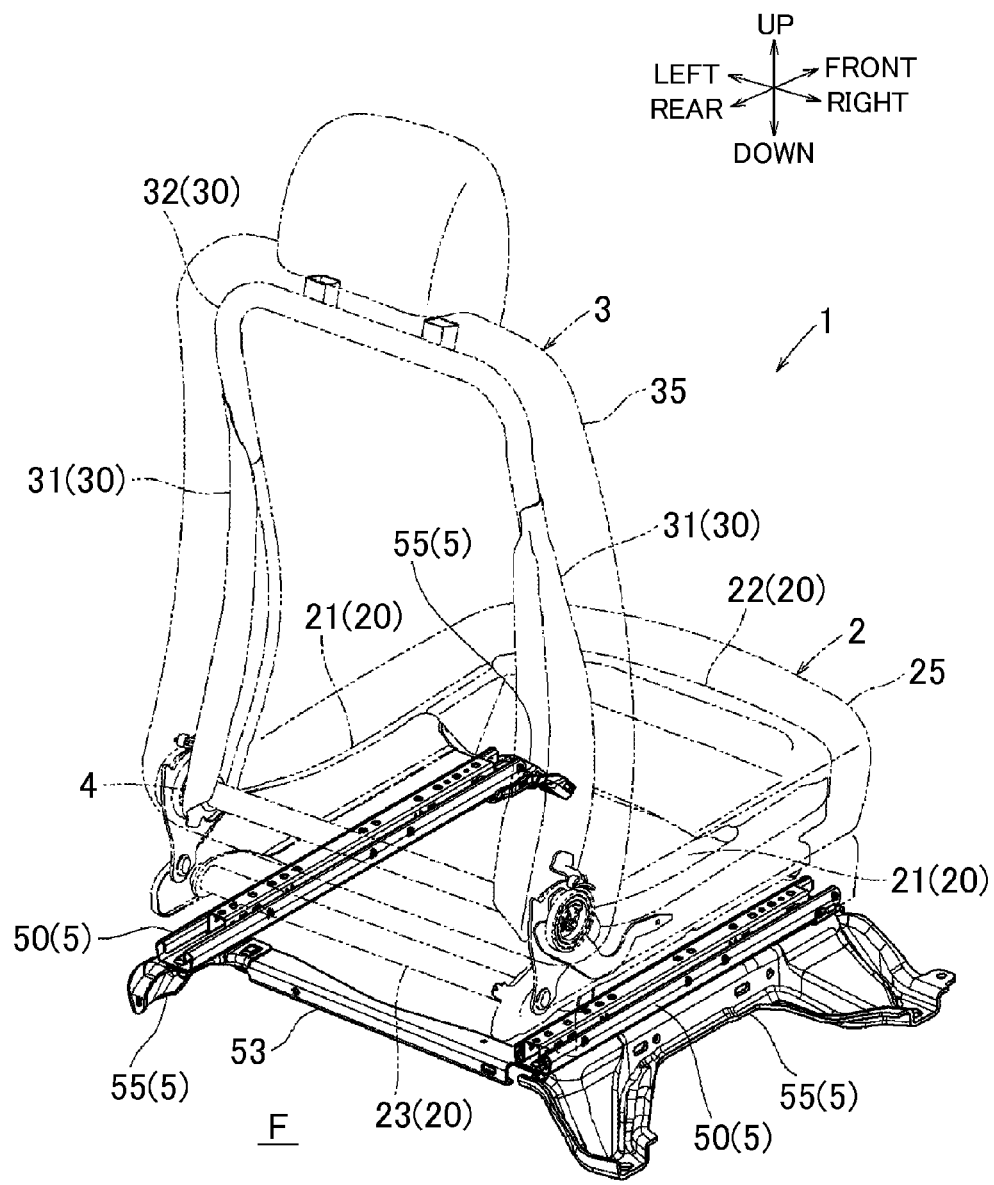
FIG. 1 is a perspective view of a vehicle seat of an embodiment of the invention when viewed obliquely from behind.

As shown in FIG. 1, a vehicle seat 1 of the present embodiment includes a seat cushion 2, a seat back 3, and a slide mechanism 5 that supports the seat cushion 2 to a floor F such that the seat cushion 2 is slidable in a front and rear direction. Lower end portions of the seat back 3 on both sides are coupled to rear end portions of the seat cushion 2 via recliners 4. Each recliner 4 performs a function of adjusting a tilt angle of the seat back 3 with respect to the seat cushion 2. Herein, the seat cushion 2 and the seat back 3 are an example of a "seat main body" of CLAIMS.

The seat cushion 2 has a structure in which a cushion pad (not shown) as a cushion material is placed on a cushion frame 20, and the cushion pad is covered with a cushion cover 25 as a skin material. The cushion frame 20 is formed into a rectangular shape when viewed from above by coupling side frames 21 as a pair of pressed parts that extend in the front and rear direction at left and right side portions of the cushion frame 20 to each other using a front panel 22 as the pressed part at a front end portion and a rear pipe 23 at a rear end portion.

The seat back 3 has a structure in which a back pad (not shown) as the cushion material is placed on a back frame 30, and the back pad is covered with a back cover 35 as the skin material. The back frame 30 is formed into an inverted U-shape when viewed from above by coupling upper end portions of back side frames 31 as a pair of pressed parts that extend in an up and down direction at left and right side portions of the back frame 30 to each other using an upper pipe 32 formed into an inverted U-shape.

As shown in FIG. 1, the slide mechanism 5 includes a pair of left and right slide rails 50 that extend in the front and rear direction, a reinforcing member 53 that couples rear end portions of the slide rails 50 to each other, and a bracket 55 that fixes the slide rail 50 to the floor F.

Figure 2:
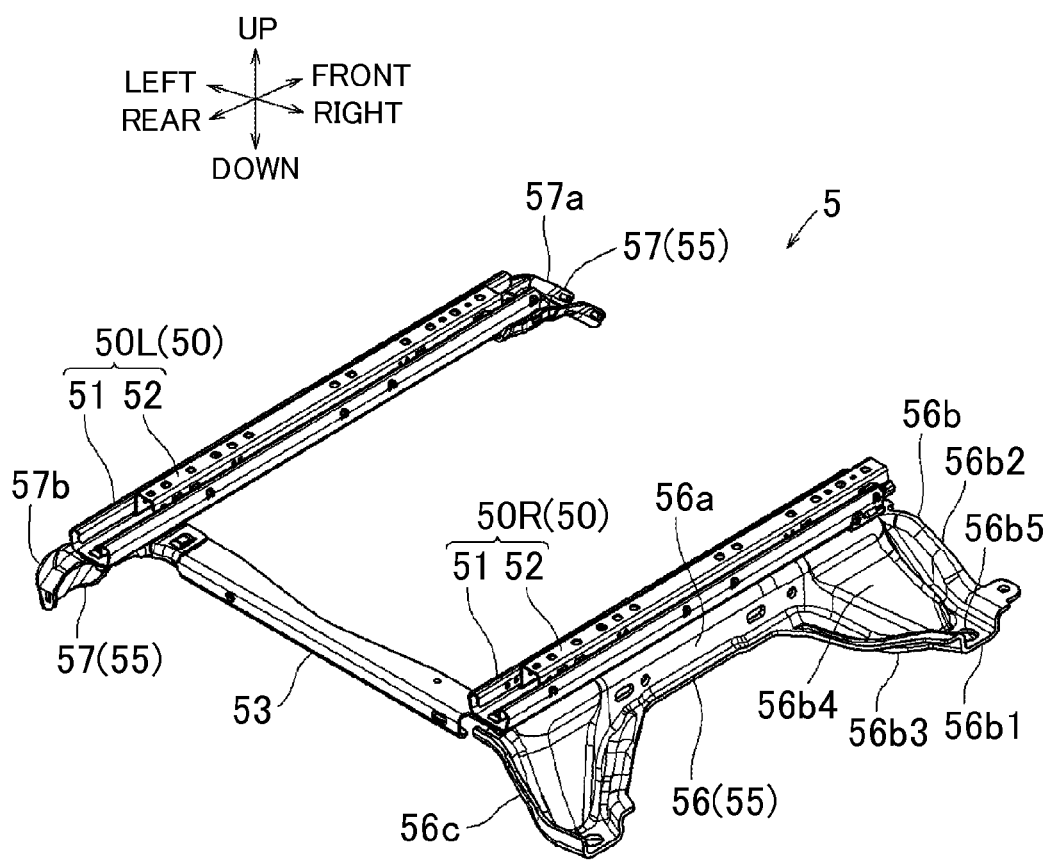
FIG. 2 is a perspective view of a slide rail and a bracket portion of the embodiment when viewed obliquely from behind.
Figure 7:
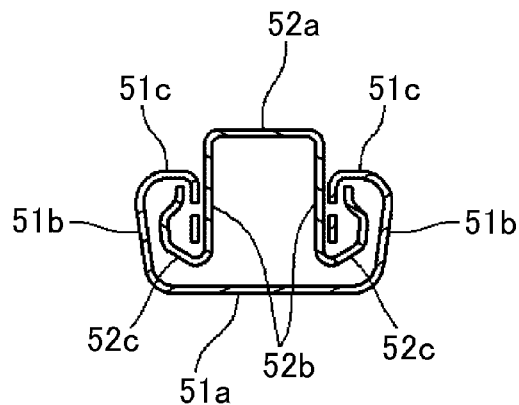
FIG. 7 is a cross-sectional view of the slide rail of the embodiment.

As shown in FIG. 2, the slide rail 50 has a lower rail 51 that is fixed to the floor F via the bracket 55, and an upper rail 52 that is slidably fitted to the lower rail 51 and is fixed to a lower surface of the side frame 21 of the cushion frame 20. As a cross section is shown in FIG. 7, the lower rail 51 is a member that has a bottom wall portion 51a, both upright wall portions 51b, and both downwardly bent wall portions 51c, and has a cross section having a constant shape in a longitudinal direction. The upper rail 52 is a member that has an upper wall portion 52a, both upright wall portions 52b, and both upwardly bent wall portions 52c, and has a cross section having a constant shape in the longitudinal direction. The upper rail 52 is mounted such that the both upright wall portions 52b and the both upwardly bent wall portions 52c are fitted to the both upright wall portions 51b and the both downwardly bent wall portions 51c of the lower rail 51. In addition, a rolling member such as a ball or a roller that is not shown is inserted between the upper rail 52 and the lower rail 51, and sliding resistance is thereby reduced.

Figure 8:
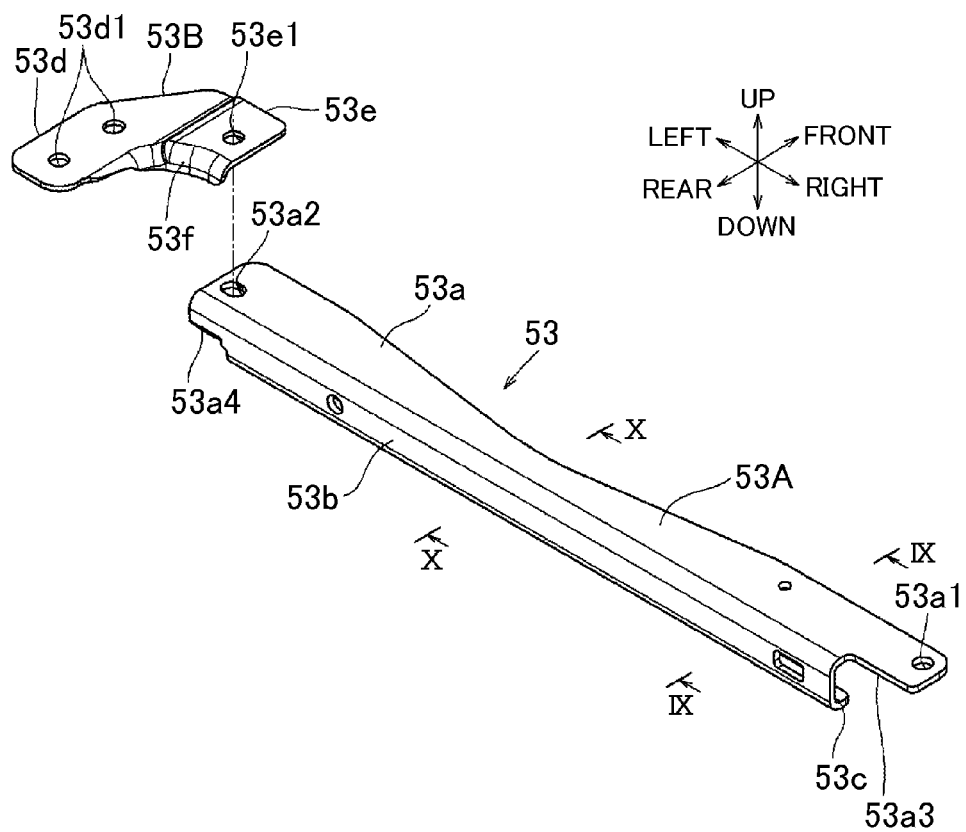
FIG. 8 is a perspective view of a reinforcing member of the embodiment.
Figure 9:
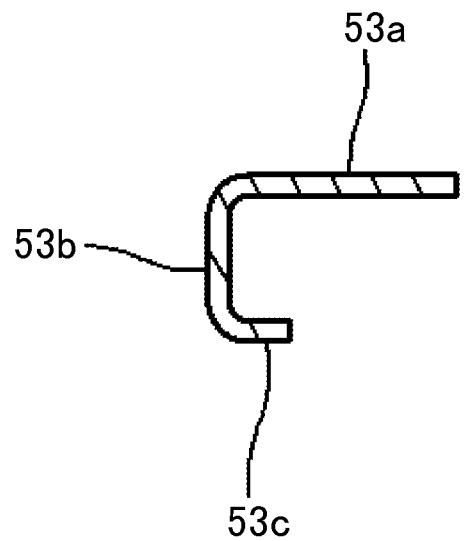
FIG. 9 is a view of an end surface along a line indicated by arrows IX-IX of FIG. 8.
Figure 10:
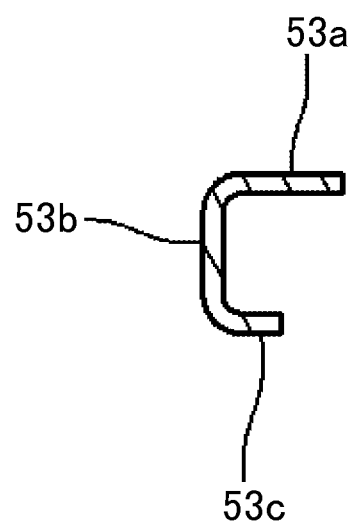
FIG. 10 is a view of an end surface along a line indicated by arrows X-X of FIG. 8.

As shown in FIGS. 8 to 10, the reinforcing member 53 has a main body portion 53A as a columnar member that extends in a left and right direction (width direction of the seat) and has a cross-sectional shape that changes in the left and right direction, and a bracket 53B for coupling a left end portion of the main body portion 53A to the left lower rail 51. The main body portion 53A has an upper wall portion 53a that extends in the left and right direction along a horizontal plane when the vehicle is placed on the horizontal plane, a rear wall portion 53b that extends downward from a rear end portion of the upper wall portion 53a, and a lower wall portion 53c that extends forward from a lower end portion of the rear wall portion 53b in parallel with the upper wall portion 53a. The upper wall portion 53a is set such that its length in the front and rear direction is minimized at a substantially central portion in the left and right direction, gradually increased with approach to both of left and right end portions, and maximized in the vicinity of both of the left and right end portions. The minimum length at the substantially central portion in the left and right direction is set to about ½ of the maximum length in the vicinity of each of the left and right end portions. The length of the rear wall portion 53b in the up and down direction is constant in the entire area, and is set to about ⅔ of the maximum length of the upper wall portion 53a in the vicinity of each of the left and right end portions. The length of the lower wall portion 53c in the front and rear direction is constant in the entire area, and is set to about ⅓ of the maximum length of the upper wall portion 53a in the vicinity of each of the left and right end portions. That is, the main body portion 53A is formed such that a bending strength about an axis in the up and down direction of the seat is lower than the bending strength about an axis in the front and rear direction of the seat, and the main body portion 53A is configured such that the central portion in a left and right width direction bends and deforms in a rear direction of the seat when the main body portion 53A receives a large compression load in the left and right direction. Herein, the upper wall portion 53a and the lower wall portion 53c are examples of an "upper surface portion" and a "lower surface portion" of CLAIMS, respectively. Note that the upper wall portion 53a extends forward longer than the lower wall portion 53c, and the reinforcing member 53 can be thereby disposed so as to be closer to the floor F in the case where the floor F is inclined rearward and downward.

A portion of the reinforcing member 53 in the vicinity of the right end portion is a flat plate portion 53a3 formed only of the upper wall portion 53a with the rear wall portion 53b and the lower wall portion 53c being cut off, and a bolt hole 53a1 through which a bolt (not shown) for fastening the reinforcing member 53 to the right lower rail 51 is passed is provided in the vicinity of a right end portion of the flat plate portion 53a3. In addition, a portion of the reinforcing member 53 in the vicinity of a left end portion is an L-shaped portion 53a4 with a lower portion of the rear wall portion 53b and the lower wall portion 53c being cut off, and a bolt hole 53a2 through which a bolt (not shown) for fastening the reinforcing member 53 to the left lower rail 51 via the bracket 53B is passed is provided in the upper wall portion 53a in the vicinity of a left end portion of the L-shaped portion 53a4. The bracket 53B is a substantially L-shaped member when viewed from above, and includes a lower rail mounting portion 53d, a main body portion coupling portion 53e, and an integral upright wall portion 53f that extends obliquely downward from a right end portion of the lower rail mounting portion 53d and a rear end portion of the main body portion coupling portion 53e. The lower rail mounting portion 53d extends in the front and rear direction and, in a central portion of the lower rail mounting portion 53d in the left and right direction, two bolt holes 53d1 through which bolts (not shown) for fixing the rear end portion of the left lower rail 51 are passed are provided at a predetermined interval in the front and rear direction. In addition, the main body portion coupling portion 53e extends in the right direction, and a bolt hole 53e1 which is aligned with the bolt hole 53a2 of the upper wall portion 53a of the main body portion 53A and allows passage of a bolt (not shown) is provided in a central portion of the main body portion coupling portion 53e in the front and rear direction.

Figure 3:
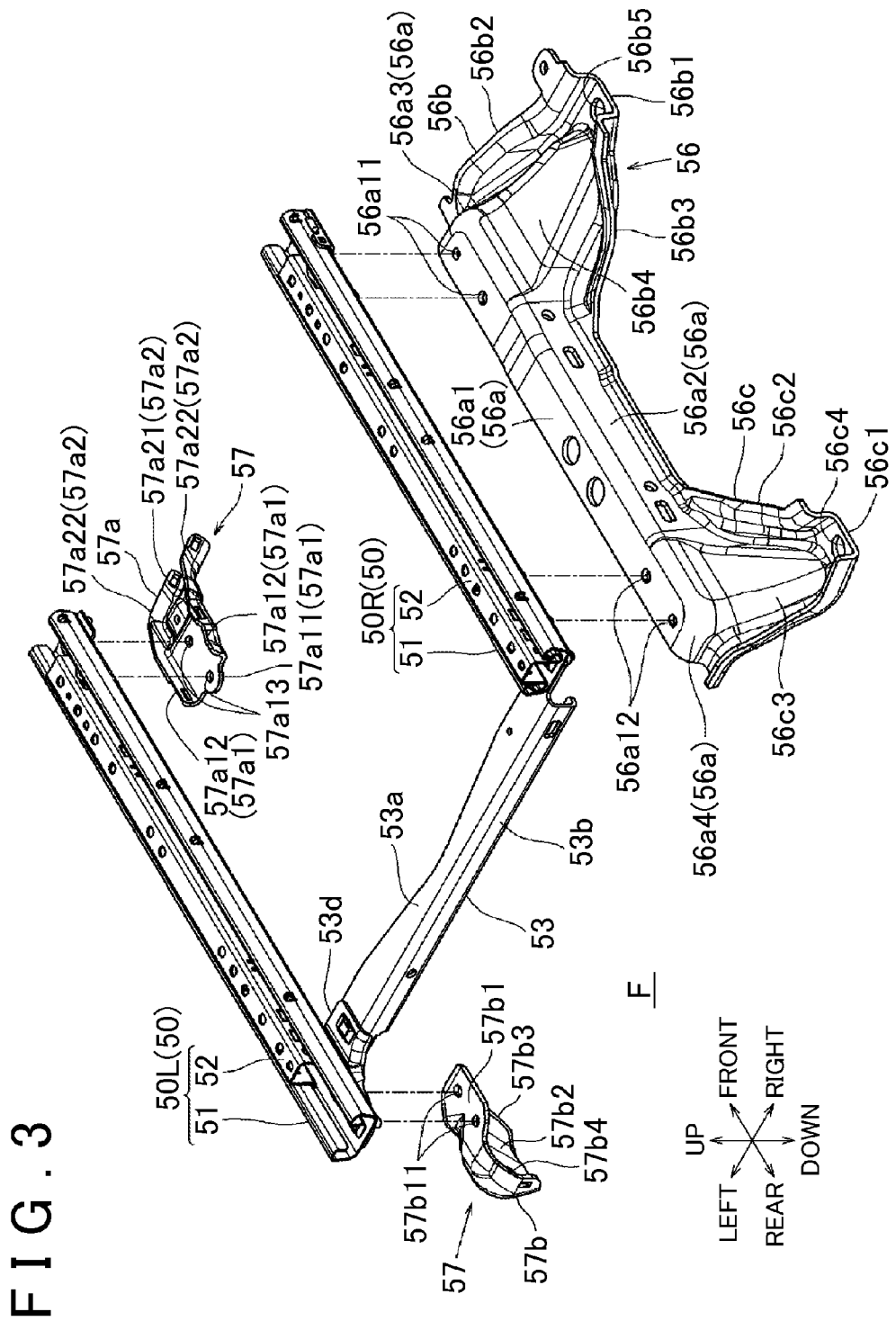
FIG. 3 is an exploded perspective view of the slide rail and the bracket portion of the embodiment when viewed obliquely from behind.

As shown in FIG. 2, the bracket 55 has a right bracket 56 and a left bracket 57. The right bracket 56 is a pressed part including a main body portion 56a that extends in the front and rear direction along a lower surface of the bottom wall portion 51a of the lower rail 51, a front leg portion 56b that is provided at a front end portion of the main body portion 56a, and a rear leg portion 56c that is provided at a rear end portion of the main body portion 56a. As shown in FIG. 3, the main body portion 56a has a lower rail mounting surface 56a1 that extends in the front and rear direction in parallel with the floor F, a side wall portion 56a2 that extends obliquely rightward and downward from a right end portion of the lower rail mounting surface 56a1 (an outer end portion of the seat), a front wall portion 56a3 that extends obliquely forward and downward from a front end portion of the lower rail mounting surface 56a1, and a rear wall portion 56a4 that extends obliquely rearward and downward from a rear end portion of the lower rail mounting surface 56a1. In a central portion of the lower rail mounting surface 56a1 in the left and right direction in the vicinity of the front end portion, two bolt holes 56a11 through which bolts (not shown) for fixing the front end portion of the lower rail 51 are passed are provided at a predetermined interval in the front and rear direction. In addition, in a central portion of the lower rail mounting surface 56a1 in the left and right direction in the vicinity of the rear end portion, two bolt holes 56a12 through which bolts (not shown) for fixing the rear end portion of the lower rail 51 are passed are provided at a predetermined interval in the front and rear direction.

As shown in FIG. 3, the front leg portion 56b is in a substantially tongue-like shape, and extends rightward, forward, and downward from a lower end of the front wall portion 56a3 and a front lower end of the side wall portion 56a2. A front flange portion 56b2 is provided at an opening-side front end portion of a main portion 56b1 having a substantially U-shaped cross section, a rear flange portion 56b3 is provided at an opening-side rear end portion, a swollen portion 56b4 is provided upward at a central portion, and stiffness is secured by increasing a section modulus. In a tip portion of the main portion 56b 1, a bolt hole 56b5 through which a bolt (not shown) for fixing the front leg portion 56b to the floor F is passed is provided. The rear leg portion 56c is in a substantially tongue-like shape, and extends rightward and downward from a lower end of the rear wall portion 56a4 and a rear lower end of the side wall portion 56a2. A front flange portion 56c2 is provided at an opening-side front end portion of a main portion 56c1 having a substantially U-shaped cross section, a swollen portion 56c3 is provided upward at a central portion, and the stiffness is secured by increasing the section modulus. A bolt hole 56c4 through which a bolt (not shown) for fixing the rear leg portion 56c to the floor F is passed is provided in a tip portion of the main portion 56c1.

Figure 4:
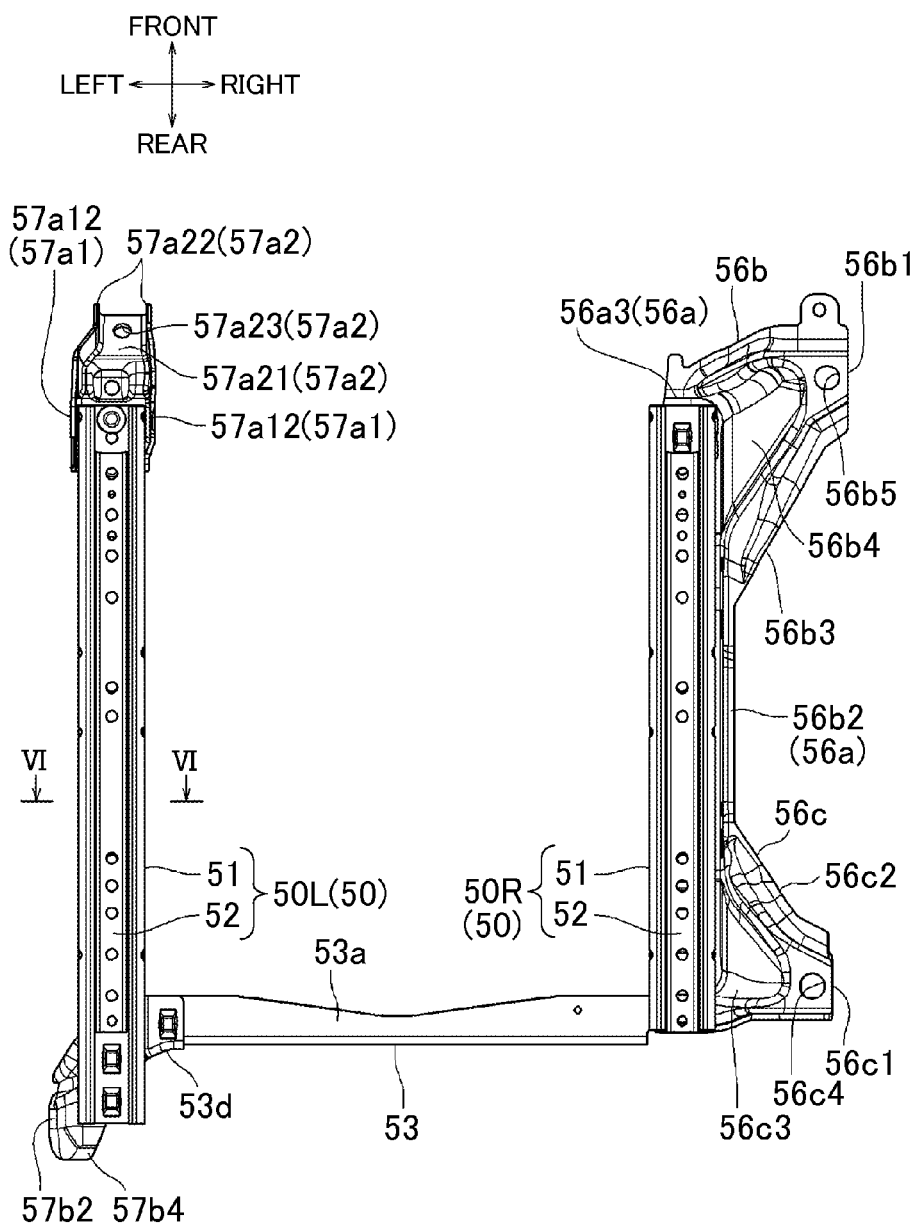
FIG. 4 is a plan view of the slide rail and the bracket portion of the embodiment.

As shown in FIGS. 3 and 4, the left bracket 57 has a front bracket 57a and a rear bracket 57b. The front bracket 57a includes a lower rail mounting portion 57a1 that has a substantially U-shaped cross section and extends in the front and rear direction in parallel with the floor F, and a floor mounting portion 57a2 that extends forward and downward from a front end portion of the lower rail mounting portion 57a1 and has a substantially U-shaped cross section. The lower rail mounting portion 57a1 includes a bottom surface portion 57a11 that has a cross section corresponding to the closed side of the substantially U-shape and to which the front end portion of the lower rail 51 is mounted, and upright wall portions 57a12 that extend upward from left and right end portions of the bottom surface portion 57a11. The floor mounting portion 57a2 includes an oblique bottom surface portion 57a21 that has a cross section corresponding to the closed side of the substantially U-shape and extends forward and downward from a front end of the bottom surface portion 57a11 while reducing its width in the left and right direction, and upright wall portions 57a22 that extend forward and upward from left and right end portions of the oblique bottom surface portion 57a21. The upright wall portions 57a12 and the upright wall portions 57a22 are smoothly coupled to each other. In a central portion of the bottom surface portion 57a11 in the left and right direction, two bolt holes 57a13 through which bolts (not shown) for fixing the front end portion of the lower rail 51 are passed are provided at a predetermined interval in the front and rear direction. In a front lower end portion of the oblique bottom surface portion 57a21, a bolt hole 57a23 through which a bolt (not shown) for fixing the front bracket 57a to the floor F is passed is provided.

Figure 5:
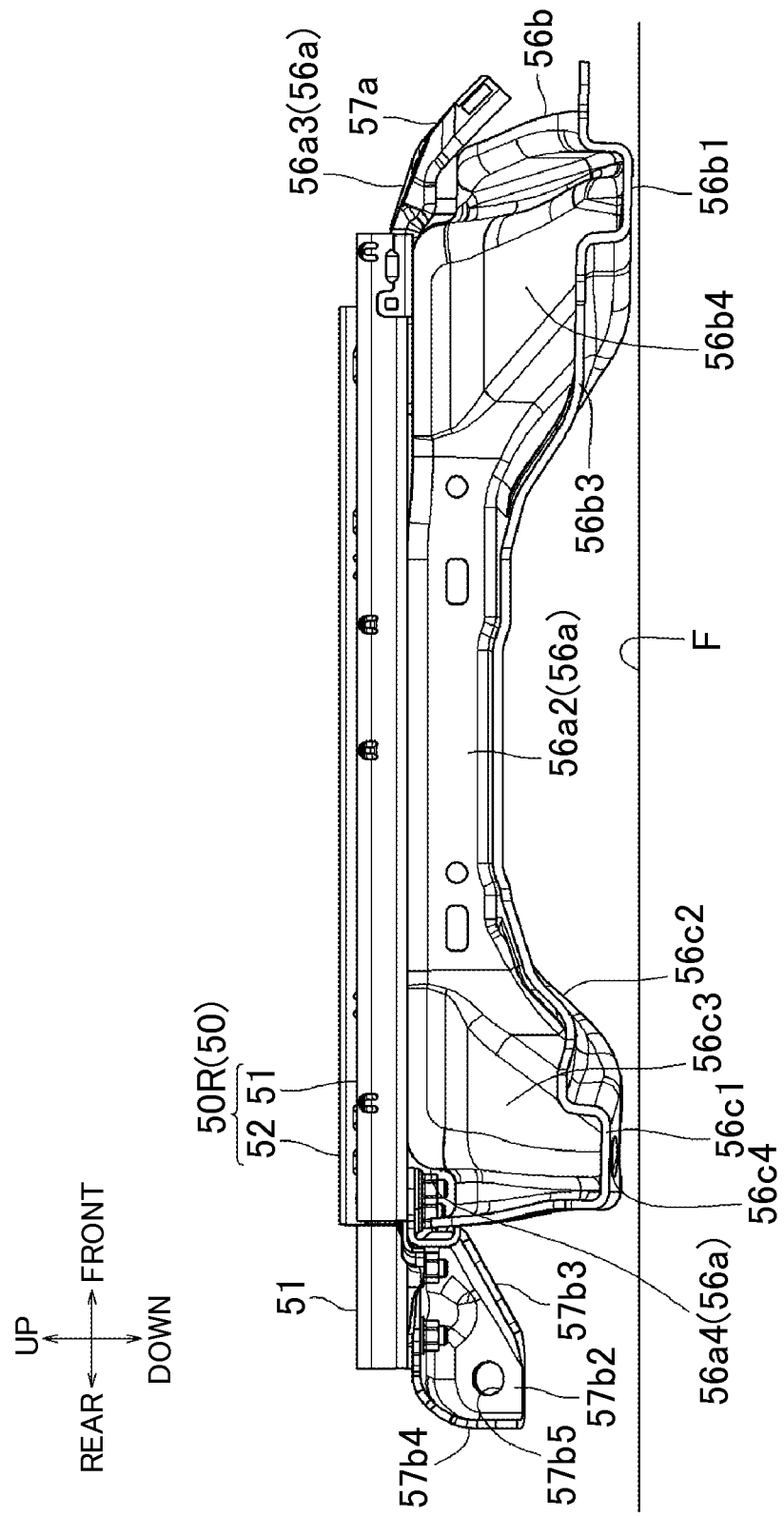
FIG. 5 is a side view of the slide rail and the bracket portion of the embodiment.

As shown in FIGS. 3 and 5, the rear bracket 57b includes a lower rail mounting portion 57b1 that has a substantially L-shaped cross section in the left and right direction and extends in the front and rear direction in parallel with the floor F, and a floor mounting portion 57b2 that extends leftward, rearward, and downward from a left end portion of the lower rail mounting portion 57b1. A front upright wall portion 57b3 that extends to the right from a front end portion of the floor mounting portion 57b2 is provided, a rear upright wall portion 57b4 that extends to the right from a rear end portion of the floor mounting portion 57b2 is provided, and stiffness is thereby secured. In a central portion of the lower rail mounting portion 57b1 in the left and right direction, two bolt holes 57b11 through which bolts (not shown) for fixing the rear end portion of the lower rail 51 are passed are provided at a predetermined interval in the front and rear direction. In the vicinity of a central portion of the floor mounting portion 57b2 in the up and down direction, a bolt hole 57b5 through which a bolt (not shown) for fixing the rear bracket 57b to the floor F is passed is provided.

A description will be given of procedures of mounting the vehicle seat 1 to the floor F with reference to mainly FIGS. 3 and 8. Two bolt holes (not shown) provided in the rear end portion of the lower rail 51 of the left slide rail 50L, the two bolt holes 53d1 of the bracket 53B of the reinforcing member 53, and the two bolt holes 57b11 of the rear bracket 57b are aligned with each other, bolts are passed through the above bolt holes, and the lower rail 51, the bracket 53B, and the rear bracket 57b are fastened and fixed to each other. Two bolt holes (not shown) provided in the front end portion of the lower rail 51 of the left slide rail 50L and the two bolt holes 57a13 of the front bracket 57a are aligned with each other, bolts are passed through the above bolt holes, and the lower rail 51 and the front bracket 57a are fastened and fixed to each other. Next, the side frames 21 of the cushion frame 20 are coupled to the respective upper rails 52 of the slide rails 50R and 50L. The recliners 4 are mounted to the rear end portions of the side frames 21, the cushion pad is placed on the cushion frame 20, and the cushion cover 25 is put on the cushion pad. The seat back 3 that is manufactured by placing the back pad on the back frame 30 in advance and putting the back cover 35 on the back pad is mounted to the cushion frame 20 via the recliners 4. The bolt hole 53e1 of the bracket 53B mounted to the left slide rail 50L and the bolt hole 53a2 of the main body portion 53A of the reinforcing member 53 are aligned with each other, a bolt is passed through the above bolt holes, and the bracket 53B and the main body portion 54A are fastened and fixed to each other. A bolt hole (not shown) provided in the rear end portion of the lower rail 51 of the right slide rail 50R and the bolt hole 53a1 of the main body portion 53A of the reinforcing member 53 are aligned with each other, a bolt is passed through the above bolt holes, and the lower rail 51 and the main body portion 53A are fastened and fixed to each other. Two bolt holes (not shown) provided in the vicinity of the front end portion and the rear end portion of the lower rail 51 of the right slide rail 50R, and the two bolt holes 56a11 and the two bolt holes 56a12 provided in the vicinity of the front end portion and the rear end portion of the lower rail mounting surface 56a1 of the right bracket 56 are aligned with each other, bolts are passed through the above bolt holes, and the lower rail 51 and the lower rail mounting surface 56a1 are fastened and fixed to each other. The vehicle seat 1 including the slide mechanism 5 completed by the above procedures is placed on the floor F, bolts are passed through the bolt hole 56b5, the bolt hole 56c4, the bolt hole 57a23, and the bolt hole 57b5 of the right bracket 56 and the left bracket 57, and bolt holes with stud nuts provided at predetermined positions of the floor F, and the vehicle seat 1 and the floor F are fastened and fixed to each other.

Figure 6:
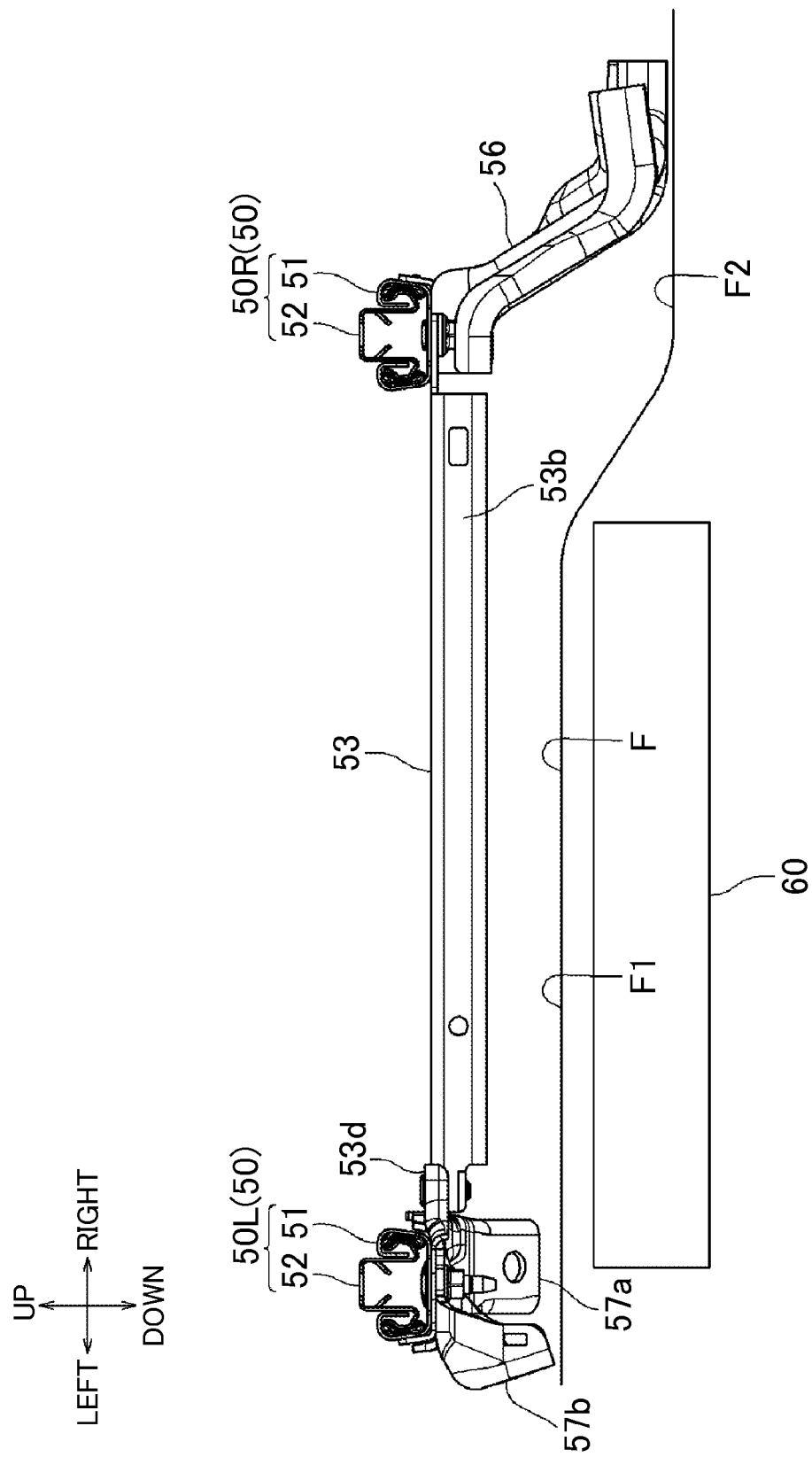
FIG. 6 is a front view of the slide rail and the bracket portion of the embodiment in which a cross section of a floor is also shown.

A description will be given of a relationship between the vehicle seat 1 and the floor F when the vehicle seat 1 is mounted to the floor F. As shown in FIG. 6, the cross section of the floor F below the vehicle seat 1 is reduced in height stepwise from the left side of the seat (the side of the central portion of the vehicle) to the right side of the seat (the outer side of the vehicle). That is, a high floor portion F1 from the left end portion of the seat to a portion slightly to the right of the central portion of the seat and a low floor portion F2 from the portion slightly to the right of the central portion of the seat to the right end portion of the seat are provided, and the high floor portion F1 and the low floor portion F2 are gradually coupled to each other. A functional part 60 such as a battery unit is disposed below the high floor portion F1. Each of a distance between the right slide rail 50R and the bolt hole 56b5 of the right bracket 56 and a distance between the right slide rail 50R and the bolt hole 56c4 of the right bracket 56 is about 4 times the height of the slide rail 50 in a height direction, and is about twice the width of the slide rail 50 in the left and right direction. With this, the right slide rail 50R is disposed at a position that is offset upward and leftward from the mounting position of the right bracket 56 to the floor F. On the other hand, each of a distance between the left slide rail 50L and the bolt hole 57a23 of the front bracket 57a and a distance between the left slide rail 50L and the bolt hole 57b5 of the rear bracket 57b is about 1 times the height of the slide rail 50 in the height direction, and is about 1 or less times the width of the slide rail 50 in the left and right direction. With this, the left slide rail 50L is disposed at a position that is scarcely offset upward and rightward from the mounting position of the left bracket 57 to the floor F. Consequently, when a large force that tilts the vehicle seat 1 rearward acts due to the rear-end collision of the vehicle, in the case where a force that pushes down the rear end portions of the slide rails 50 is applied, the left slide rail 50L is less likely to fall in the left and right direction, but the right slide rail 50R is likely to fall to the left. To cope with this, in the vehicle seat 1 of the present embodiment, the rear end portions of the left and right slide rails 50 are coupled to each other using the reinforcing member 53, and the right slide rail 50R is thereby prevented from falling to the left.

The thus configured present embodiment achieves the following operation and effect. When the rear-end collision occurs in the vehicle to which the vehicle seat 1 is mounted, a large force is applied toward the rear of the vehicle seat 1. Since the vehicle seat 1 is mounted to the front and rear end portions of the upper rails 52 of the left and right slide rails 50, a force that pushes down the rear portion of the upper rail 52 and lifts the front portion thereof upward acts. This force is transmitted to the lower rail 51 that is slidably fitted to the upper rail 52. In the rear bracket 57b of the left bracket 57 that supports the left lower rail 51 to the floor F, a height from a fixation point to the floor F to the left lower rail 51 is small and an offset amount in the left and right direction is also small, and hence the rear bracket 57b is less likely to fall in the left and right direction by the pushing-down force. On the other hand, in the rear leg portion 56c of the right bracket 56 that supports the right lower rail 51 to the floor F, a height from the fixation point to the floor F to the right lower rail 51 is large and the offset amount in the left and right direction is also large, and hence the rear leg portion 56c is likely to fall in the left and right direction by the pushing-down force. Incidentally, the rear end portion of the left lower rail 51 and the rear end portion of the right lower rail 51 are coupled to each other using the reinforcing member 53. With this, it is possible to prevent a situation in which the rear end portion of the right slide rail 50R falls in the left direction (an inner direction of the vehicle) together with the rear leg portion 56c of the right bracket 56 and the vehicle seat 1 is tilted rearward greatly, and suppress the occurrence of whiplash to a seated passenger.

In addition, when a side collision occurs in the vehicle to which the vehicle seat 1 is mounted and a large force toward the left is applied to the vehicle seat 1 from the side, the right lower rail 51 is pushed to the left via the right bracket 56, and a large compression load acts on the reinforcing member 53 between the left and right lower rails 51. At this point, the length of the upper wall portion 53a of the reinforcing member 53 in the front and rear direction is minimized at the substantially central portion in the left and right direction, and the length is set to be shorter than the length of the rear wall portion 53b in the up and down direction, and longer than the length of the lower wall portion 53c in the front and rear direction. With this, the main body portion 53A of the reinforcing member 53 is formed such that the bending strength about the axis in the up and down direction of the seat is lower than the bending strength about the axis in the front and rear direction of the seat, and is configured such that the central portion in the left and right width direction bends and deforms in the rear direction of the seat when the main body portion 53A thereof receives the large compression load in the left and right direction. Consequently, the main body portion 53A of the reinforcing member 53 does not bend and deform in the up and down direction, but bends and deforms in the front and rear direction. With this, it is possible to suppress a possibility that a part of the reinforcing member 53 interferes with the lower portion of the seat cushion 2 and the floor F, and damages the lower portion of the seat cushion 2 and the floor F or the functional part or the like in the vicinity thereof.

Note that the compression load applied to the reinforcing member 53 at the time of the rear-end collision of the vehicle is about ¹⁄₄₀ of the compression load applied to the reinforcing member 53 at the time of the side collision of the vehicle, and is at a level at which the reinforcing member 53 scarcely deforms at the time of the rear-end collision.

The specific embodiment has been described thus far, but the invention is not limited to the outer appearance and the configuration of the embodiment, and various changes, additions, and deletions may be made without departing from the gist of the invention. For example, the following changes may be made.

1. In the above embodiment, the rear end portions of the lower rails 51 of the left and right slide rails 50 are coupled to each other using the reinforcing member 53, but the invention is not limited thereto. The rear end portions of the upper rails 52 of the left and right slide rails 50 may also be coupled to each other using the reinforcing member 53.

2. In the above embodiment, the rear wall portion 53b is provided on the rear end side of the upper wall portion 53a of the main body portion 53A of the reinforcing member 53, but the invention is not limited thereto. A front wall portion may also be provided on the front end side of the upper wall portion 53a. That is, the opening portion of the substantially U-shaped cross section of the main body portion 53A of the reinforcing member 53 may be disposed so as to be directed rearward. In this case, when the large compression load is applied to the main body portion 53A of the reinforcing member 53, the main body portion 53A of the reinforcing member 53 bends and deforms such that a middle portion of the main body portion 53A of the reinforcing member 53 in the left and right direction moves forward.

3. In the above embodiment, the left end portion of the main body portion 53A of the reinforcing member 53 is mounted to the lower rail 51 of the left slide rail 50L via the bracket 53B, but the invention is not limited thereto. The left end portion of the main body portion 53A of the reinforcing member 53 may also be mounted to the lower rail 51 of the left slide rail 50L directly.

4. In the above embodiment, the reinforcing member 53 is made of iron, but the invention is not limited thereto. As long as a strength requirement is satisfied, the reinforcing member 53 may also be made of a light alloy, a resin, or a fiber reinforced composite resin.

5. In the above embodiment, the reinforcing member 53 is mounted between the left and right slide rails 50 so as to be exposed, but the invention is not limited thereto. The reinforcing member 53 may also be covered with a cover material such as a carpet in order to improve design.

6. In the above embodiment, the invention is applied to the vehicle seat, but the invention may also be applied to a seat mounted on a boat or an electric train.

What is claimed is:

1. A vehicle seat comprising:
   a seat main body;
   a pair of left and right slide rails each having a lower rail extending in a front and rear direction of the seat main body and an upper rail slidably mounted to the lower rail; and
   a reinforcing member that extends in a left and right direction and is disposed between the pair of left and right lower rails or the pair of left and right upper rails, wherein
   the lower rail is fixable to a vehicle floor via a bracket so as to be spaced apart from the vehicle floor,
   the seat main body is mounted to the upper rail,
   the reinforcing member is a columnar member having a substantially U-shaped cross section that spans between the pair of left and right lower rails or the pair of left and right upper rails in a state in which an opening of the U-shape cross section is directed to one of the front or the rear direction of the seat main body, and
   a section modulus of the reinforcing member about the axis in the front and rear direction of the seat main body changes in the front and rear direction as the reinforcing member extends in the left and right direction of the seat main body, and the section modulus of the reinforcing member in the front and rear direction is minimized at a central portion of the reinforcing member in the left and right direction of the seat main body and is gradually increased in the front and rear direction toward end portions of the reinforcing member such that a bending strength about an axis in an up and down direction of the seat main body is lower than a bending strength about an axis in the front and rear direction of the seat main body.

2. The vehicle seat according to claim 1, wherein the reinforcing member is disposed rearwardly of central portions of the pair of the left and right lower rails or the pair of the left and right upper rails in the front and rear direction.

3. The vehicle seat according to claim 1, wherein the reinforcing member is configured such that a length of at least one of an upper surface portion and a lower surface portion of the reinforcing member in the front and rear direction is minimized at the central portion in the left and right direction of the seat main body, and is gradually increased toward the end portions of the reinforcing member.

4. The vehicle seat according to claim 1, wherein the columnar member includes:
   an upper wall portion that extends in the left and right direction;
   a rear wall portion that extends downward from a rear end portion of the upper wall portion; and
   a lower wall portion that extends forward from a lower end portion of the rear wall portion, wherein
   end portions of the upper wall portion in the left and right direction, respectively, are larger than end portions of the lower wall portion in the left and right direction, respectively.

5. The vehicle seat according to claim 1, wherein the columnar member includes:
   an upper wall portion that extends in the left and right direction and includes end portions at opposite sides of the upper wall portion in the left and right direction;
   a rear wall portion that extends downward from a rear end portion of the upper wall portion; and
   a lower wall portion that extends forward from a lower end portion of the rear wall portion and includes end portions at opposite sides of the lower wall portion in the left and right direction, wherein
   one of the end portions of the upper wall portion in the left and right direction is larger than a corresponding one of the end portions of the rear wall portion in the left and right direction, respectively.

6. The vehicle seat according to claim 1, wherein the reinforcing member is coupled to the lower rail.

7. A vehicle seat comprising:
   a seat main body;
   a pair of left and right slide rails each having a lower rail extending in a front and rear direction of the seat main body and an upper rail slidably mounted to the lower rail; and
   a reinforcing member that extends in a left and right direction and is disposed between the pair of left and right lower rails or the pair of left and right upper rails, wherein
   the lower rail is fixable to a vehicle floor via a bracket so as to be spaced apart from the vehicle floor,
   the seat main body is mounted to the upper rail, and
   the reinforcing member is a columnar member having a substantially U-shaped cross section that spans between the pair of left and right lower rails or the pair of left and right upper rails in a state in which an opening of the U-shape cross section is directed to one of the front or the rear direction of the seat main body, wherein
   the columnar member includes:
     an upper wall portion that extends in the left and right direction;
     a rear wall portion that extends downward from a rear end portion of the upper wall portion; and
     a lower wall portion that extends forward from a lower end portion of the rear wall portion in parallel with the upper wall portion, wherein
     end portions of the upper wall portion in the left and right direction, respectively, extend beyond corresponding end portions of the rear wall portion and the lower wall portion in the left and right direction, respectively, for fastening the columnar member to the lower rail.

* * * * *